US010766740B2

(12) United States Patent
Li

(10) Patent No.: US 10,766,740 B2
(45) Date of Patent: Sep. 8, 2020

(54) LOCATION IDENTIFICATION AND LOCATION RECOVERY OF ELEVATOR

(71) Applicant: Otis Elevator Company, Farmington, CT (US)

(72) Inventor: GuoSong Li, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 418 days.

(21) Appl. No.: 15/698,996

(22) Filed: Sep. 8, 2017

(65) Prior Publication Data

US 2018/0072534 A1 Mar. 15, 2018

(30) Foreign Application Priority Data

Sep. 9, 2016 (CN) .......................... 2016 1 0811914

(51) Int. Cl.
*B66B 1/34* (2006.01)
*G05B 19/4067* (2006.01)
*B66B 1/52* (2006.01)

(52) U.S. Cl.
CPC ........ *B66B 1/3492* (2013.01); *G05B 19/4067* (2013.01); *B66B 1/52* (2013.01)

(58) Field of Classification Search
CPC .......... B66B 1/3492; B66B 1/52; B66B 3/02; B66B 1/36; B66B 1/30; G05B 19/4067
See application file for complete search history.

(56) References Cited

U.S. PATENT DOCUMENTS

| 5,153,390 | A | * | 10/1992 | Barkman | .............. B66B 1/3492 187/283 |
| 5,631,452 | A | * | 5/1997 | Jamieson | .............. B66B 1/3492 187/391 |
| 5,783,783 | A | * | 7/1998 | Toutaoui | .............. B66B 1/3492 187/294 |
| 6,526,368 | B1 | | 2/2003 | Coste et al. | |
| 6,874,244 | B2 | | 4/2005 | Birrer et al. | |
| 7,537,092 | B2 | | 5/2009 | Birrer et al. | |
| 7,669,698 | B2 | * | 3/2010 | Jahkonen | .............. B66B 1/3492 187/247 |

(Continued)

FOREIGN PATENT DOCUMENTS

CN          1997580 A     7/2007
EP          2578526 A1    4/2013

(Continued)

OTHER PUBLICATIONS

European Search Report for application EP 17190226.5, dated Feb. 12, 2018, 10 pages.

(Continued)

*Primary Examiner* — Jeffrey Donels
(74) *Attorney, Agent, or Firm* — Cantor Colburn LLP

(57) ABSTRACT

The present invention relates to location recognition and recovery of an elevator system, and belongs to the technical field of elevators. The elevator system of the present invention has a location recovery/recognition system comprising: a landing floor information component or a calling component, a sensing component arranged corresponding to each landing floor information component or calling component and coupled to the landing floor information component or calling component, and a trigger component mounted on the elevator car.

27 Claims, 4 Drawing Sheets

(56) References Cited

U.S. PATENT DOCUMENTS

| | | |
|---|---|---|
| 8,123,003 B2 | 2/2012 | Meri et al. |
| 8,464,841 B2 | 6/2013 | Birrer et al. |
| 8,985,281 B2 * | 3/2015 | De Coi ................ B66B 1/3492 187/394 |
| 9,193,563 B2 | 11/2015 | Arnold et al. |
| 2002/0043433 A1 * | 4/2002 | Tanino ................ B66B 1/3492 187/394 |
| 2005/0039987 A1 | 2/2005 | Redden |
| 2009/0166134 A1 * | 7/2009 | Jahkonen ............. B66B 1/3492 187/394 |
| 2015/0217968 A1 | 8/2015 | Huff et al. |
| 2015/0314985 A1 | 11/2015 | Schoenauer et al. |

FOREIGN PATENT DOCUMENTS

| | | |
|---|---|---|
| ES | 2114653 T3 | 6/1998 |
| JP | 2013530905 A | 8/2013 |
| JP | 2015113180 A | 6/2015 |
| WO | 2004106210 A1 | 12/2004 |
| WO | 2016096824 A1 | 6/2016 |

OTHER PUBLICATIONS

Chinese Office Action for application CN 201610811914.5, dated Dec. 4, 2019, 54 pages.

\* cited by examiner

LOCATION IDENTIFICATION AND LOCATION RECOVERY OF ELEVATOR

FOREIGN PRIORITY

This application claims priority to Chinese Patent Application No. 201610811914.5, filed Sep. 9, 2016, and all the benefits accruing therefrom under 35 U.S.C. § 119, the contents of which in its entirety are herein incorporated by reference.

TECHNICAL FIELD

The present invention belongs to the technical field of elevators and relates to the location recognition and recovery of an elevator system.

BACKGROUND ART

An elevator has an elevator car moving up and down in an elevator shaft. During operations of the elevator, an elevator control device needs to determine the location of the elevator car in the elevator shaft in real time, thereby controlling the operations of the elevator car based on the location information. Therefore, location information of an elevator system is the basic information for the operations of the elevator, and the location of the elevator car needs to be constantly recognized during the operations of the elevator.

However, during operations of an elevator, there is a case where the location information of the elevator car is lost, for example, due to temporary power-off of the elevator system. In this case, there is a need to recover the location information of the elevator system as soon as possible.

At present, when the location of an elevator system is lost or the current location information is invalid, an elevator control device generally controls and drives the elevator car to the bottom or the top of the elevator shaft, so that the location information of the elevator system is re-calibrated and the elevator control device obtains valid location information.

SUMMARY OF THE INVENTION

An object of the present invention is to realize location recovery of an elevator system.

A further object of the present invention is to realize location recognition of an elevator system.

A still further object of the present invention is to enable an elevator system to recognize a dummy landing.

In order to achieve the above or other objects, the present invention provides the following technical solutions.

According to a first aspect of the present invention, an elevator system is provided, comprising:
an elevator car;
an elevator shaft comprising a plurality of landings;
an elevator control device configured to at least control a movement of the elevator car within the elevator shaft; and
a location recovery system comprising:
landing floor information components arranged correspondingly on at least two of the plurality of landings and having floor location information of the corresponding landings;
a sensing component arranged corresponding to each landing floor information component and coupled to the landing floor information component; and
a trigger component mounted on the elevator car,
wherein the sensing component is capable of being triggered by the trigger component to transmit a location recovery signal to enable the corresponding coupled landing floor information component to transmit the floor location information of the landing floor information component to the elevator control device.

According to a second aspect of the present invention, a location recovery method for an elevator system is provided, wherein the elevator system comprises:
an elevator car;
an elevator shaft comprising a plurality of landings;
an elevator control device configured to at least control a movement of the elevator car within the elevator shaft; and
a location recovery system comprising:
landing floor information components arranged correspondingly on at least two of the plurality of landings and having floor location information of the corresponding landings;
a sensing component arranged corresponding to each landing floor information component and coupled to the landing floor information component; and
a trigger component mounted on the elevator car,
wherein the location recovery method comprises the steps of:
controlling the elevator car to move until it moves to a landing having the sensing component when the elevator control device loses the current location information of the elevator car or has invalid location information, and triggering the sensing component by the trigger component; and
transmitting the floor location information of the landing floor information component coupled correspondingly to the triggered sensing component as the current location information of the elevator car to the elevator control device.

According to a third aspect of the present invention, an elevator system is provided, comprising:
an elevator car;
an elevator shaft comprising a plurality of landings;
an elevator control device configured to at least control a movement of the elevator car within the elevator shaft; and
a location recognition system comprising:
a calling component arranged correspondingly on each of the landings;
a sensing component arranged corresponding to the calling component of each landing and coupled to the calling component; and
a trigger component mounted on the elevator car,
wherein each of the calling components has floor location information of the corresponding landing, and the sensing component is capable of being triggered by the trigger component to transmit a location recovery signal to enable the corresponding coupled landing floor information component to transmit the floor location information of the calling component to the elevator control device.

According to a fourth aspect of the present invention, a location recognition method for an elevator system is provided, wherein the elevator system comprises:
an elevator car;
an elevator shaft comprising a plurality of landings;
an elevator control device configured to at least control a movement of the elevator car within the elevator shaft; and
a location recognition system comprising:
a calling component arranged correspondingly on each of the landings, each of the calling components having floor location information of the corresponding landing;
a sensing component arranged corresponding to the calling component of each landing and coupled to the calling component; and a trigger component mounted on the elevator car, wherein the location recognition method comprises the steps of:

controlling the elevator car to move until it moves to a landing having the sensing component, and triggering the sensing component by the trigger component; and transmitting the floor location information of the calling component coupled correspondingly to the triggered sensing component as the current location information of the elevator car to the elevator control device.

According to a fifth aspect of the present invention, an elevator system is provided comprising:

an elevator car;

an elevator shaft comprising a dummy landing and a plurality of landings;

an elevator control device configured to at least control a movement of the elevator car within the elevator shaft; and a location recovery/recognition system comprising:

a landing floor information component arranged correspondingly on each of the plurality of landings and having floor location information of the corresponding landing;

a sensing component arranged corresponding to each landing floor information component and coupled to the landing floor information component; and a trigger component mounted on the elevator car, wherein the dummy landing is not provided with the landing floor information component and the sensing component;

wherein the sensing component is capable of being triggered by the trigger component to transmit a location recovery signal to enable the corresponding coupled landing floor information component to transmit the floor location information of the landing floor information component to the elevator control device.

According to a sixth aspect of the present invention, a method is provided for recognizing a dummy landing of the elevator system of the aforementioned fifth aspect, wherein a landing where the elevator car is correspondingly located is determined to be a dummy landing when the sensing component is not detected.

The above features and operations of the present invention will become more apparent from the following description and the accompanying drawings.

BRIEF DESCRIPTION OF THE DRAWINGS

The foregoing and other objects and advantages of the present invention will become more complete and apparent from the following detailed description with reference to the accompanying drawings, in which the same or similar elements are denoted by the same reference numerals.

DETAILED DESCRIPTION

The following is a description of some of various possible embodiments of the present invention, which are intended to provide a basic understanding of the present invention and are not intended to identify key or determinative elements of the present invention or to define the scope of protection. It will be readily appreciated that other interchangeable implementation manners may be suggested by a person of ordinary skill in the art without departing from the spirit of the invention in accordance with the technical solutions of the present invention. Therefore, the following particular embodiments and the accompanying drawings are merely exemplary explanation of the technical solutions of the present invention, and should not be considered as the entirety of the present invention or as a definition or limitation of the technical solutions of the present invention.

Figure 1:
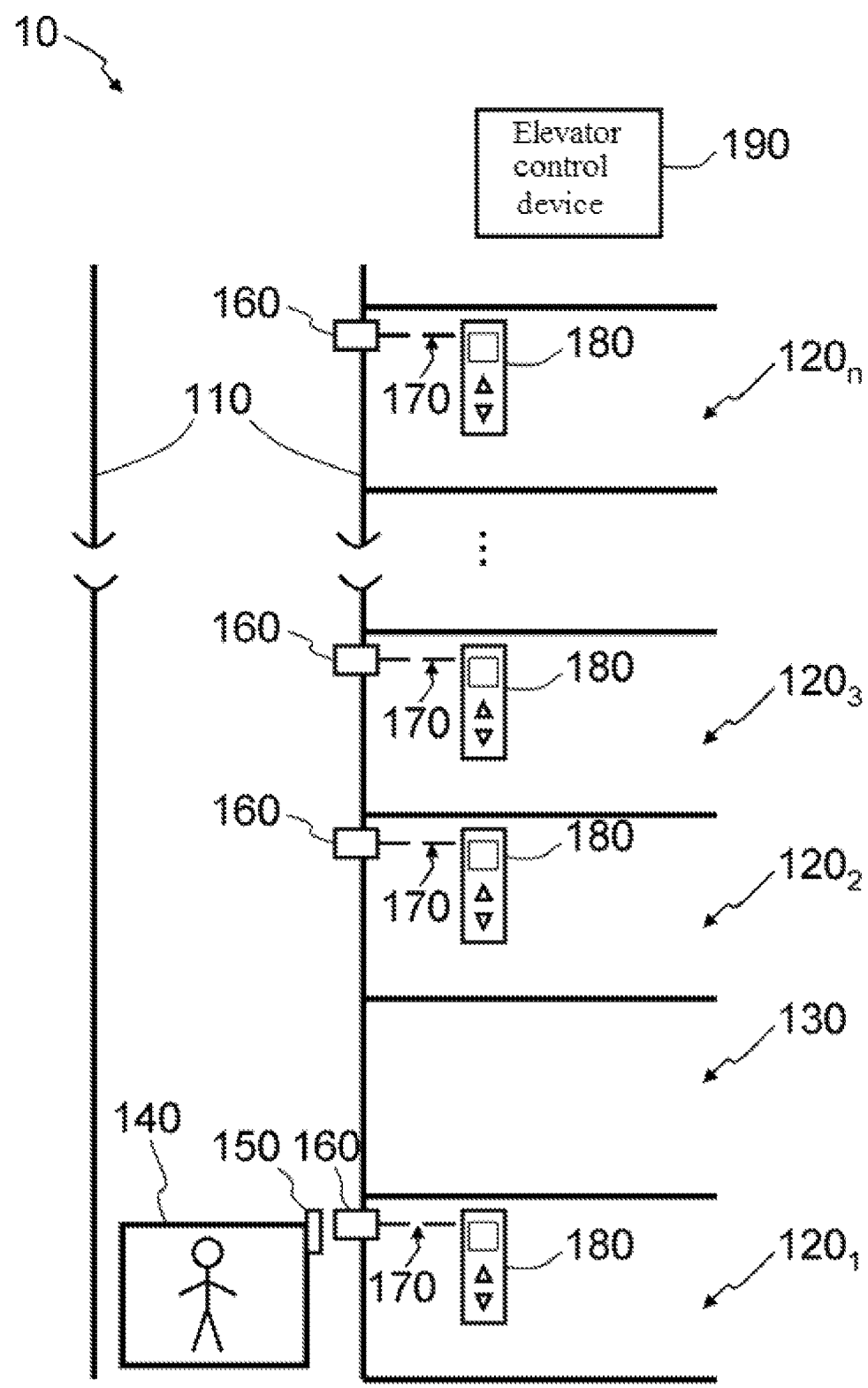
FIG. 1 is a schematic structural diagram of an elevator system according to one embodiment of the present invention.
Figure 2:
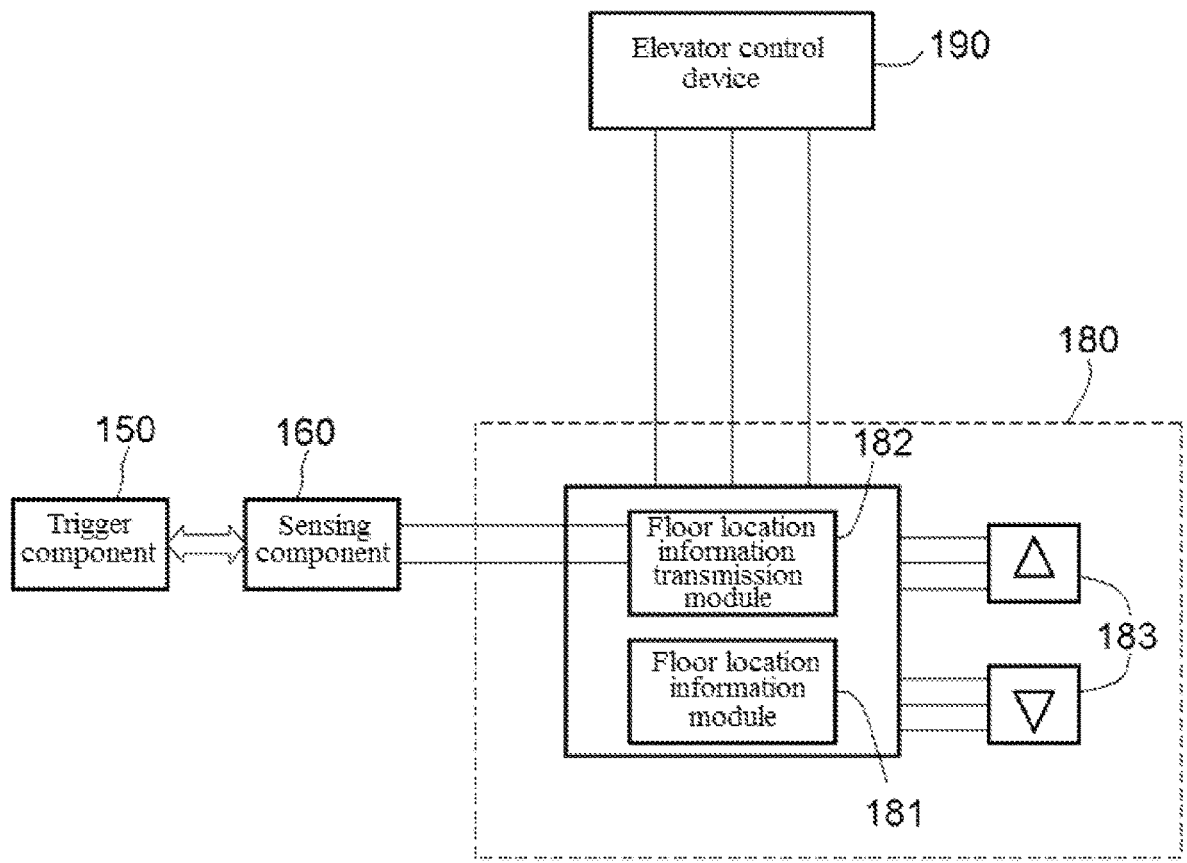
FIG. 2 is a schematic diagram of the operation of the embodiment shown in FIG. 1.

FIG. 1 shows a schematic structural view of an elevator system according to one embodiment of the present invention, and FIG. 2 shows a schematic diagram of the operation of the embodiment shown in FIG. 1. As shown in FIG. 1, an elevator system 10 is installed in buildings such as various structures in which a passenger and/or a substance needs to be transported up and down. An elevator shaft 110 and a plurality of landings 120 of the elevator system 10 are provided in the structure. In one embodiment, the structure is also correspondingly provided with a dummy landing 130 (or referred to as "blind landing") of the elevator system 10, wherein the dummy landing 130 is generally not correspondingly provided with a landing door, and is a landing arranged virtually according to the corresponding standard, and the passenger cannot leave the elevator car 140 from the dummy landing 130.

As shown in FIG. 1, the elevator system 10 includes an elevator car 140 and an elevator control device 190. The elevator car 140 is configured to carry a passenger etc. to move up and down in the elevator shaft 110, so as to carry the passenger from one of the landings 130 to another landing 130. The elevator control device 190 is a control center of the elevator system 10, which can, for example, realize various functions such as drive control of the elevator car 130 and scheduling of the elevator car 130. The specific arrangement of the elevator control device 190 is not restrictive. In order to achieve a clear and concise description of the improvement of the present invention, conventional components such as a driving component and a traction component included in the elevator system 10 are not shown and described in detail.

One of the important functions of the elevator control device 190 is to control the movement of the elevator car 190 within the elevator shaft 110 in accordance with the current floor location information of the elevator car 140. For this reason, the elevator control device 190 needs to acquire the current floor location information of the elevator car 140 and store it for later use. In one embodiment, the elevator system 10 is provided with a first location recognition system (not shown), and the first location recognition system may be any existing device or system for obtaining the current floor location information of the elevator car 140, the implementation of which will be omitted here.

During the operation of the elevator system, the location of the elevator control device 190 may be lost or the current location information may be invalid, as described previously. To this end, in one embodiment, the elevator system 10 is provided with a location recovery system.

Further referring to FIG. 1, in the elevator system 10, it is assumed that the elevator shaft 110 correspondingly has n landings, i.e., landings $120_1$, $120_2$, $120_3$ to $120_N$, landing floor information components are at least correspondingly mounted on at least two of the n landings 120, the landing floor information components having floor location information of the corresponding landings, which can be read and transmitted to the elevator control device 190. The landing floor information components may be implemented in the form of a circuit board or the like mounted on the landing 120, the specific form of which is not restrictive. In the embodiment shown in FIG. 1, the landing floor information component is specifically a calling component 180 mounted on each of the landings 120. The calling component 180 may receive a call from the passenger at each landing 120 and needs to be combined with the floor location information so as to transmit a calling signal to the elevator control device 190. Therefore, each of the calling components 180 not only has floor location information but also is coupled to the elevator control device 190, and is well suited for use as the landing floor information component of the present invention, which greatly reduces the cost.

It is to be noted that the specific implementation of the calling component 180 is not limited to the illustrated embodiment, which may be any other type of calling component that has the floor location information and is coupled to the elevator control device 190, for example, even a calling component capable of being coupled to an intelligent terminal carried by the passenger and inputting calling information via the intelligent terminal.

Further, the elevator system 10 is also provided with a sensing component 160 arranged correspondingly for each landing floor information component and coupled to the landing floor information component. In one embodiment, as shown in FIG. 1, on each landing 120, the sensing component 160 is arranged corresponding to each calling component 180 and coupled thereto. Specifically, each sensing component 160 may be coupled to the calling component 180 via an outgoing communication line 170, and an electrical signal can be transferred between the sensing component and the calling component.

Further, the elevator system 10 is also provided with a trigger component 150 mounted on the elevator car 140 and moving up and down in synchronism with the elevator car 140. Each sensing component 160 is disposed towards the elevator shaft 110, and the trigger component 150 is mounted on the elevator car 140 in a position where the trigger component can trigger the operation of the sensing component 160 when moving to the location corresponding to the sensing component 160. When the elevator car 140 moves to a certain landing (e.g., landing $120_3$), the sensing component 160 of the landing $120_3$ can be triggered by the trigger component 150 or can sense the trigger component 150, and is thus trigged to transmit an electrical signal to the calling component 180, and the calling component 180 receives the electrical signal from the sensing component 160 at this time. Therefore, the sensing component 160 of a certain landing 120 is configured to be able to detect that the elevator car 140 corresponding to the trigger component 150 arrives at the landing 120 at some point of time.

The sensing or triggering between the trigger component 150 and the sensing component 160 is based on the principle of magnetic field, the trigger component 150 may be specifically a magnetic stripe, and the sensing component 160 is specifically a magnetic induction sensor or reed switch etc., so that even the sensing component 160 in the form of, for example, a reed switch is mounted on each landing 120, the cost is relatively low.

In another alternative embodiment, the trigger component 150 and the sensing component 160 may be sensed or triggered based on the photoelectric principle, the sensing component 160 may be, for example, a photoelectric switch, and the trigger component 150 may be a component capable of preventing the photoelectric switch from receiving a photoelectric signal when the elevator car 140 reaches the location of the landing corresponding to the photoelectric switch, such as a light shielding plate. It is to be understood that the specific types and arrangements of the trigger component 150 and the sensing component 160 are not limited by the embodiments of the present invention.

In one embodiment, the trigger component 150, the plurality of sensing components 160, and the plurality of calling components 180 described above mainly form a location recovery system of the present invention, which is applied in the elevator system 10, and the specific working principle of which will be described in conjunction with FIG. 2.

In FIG. 2, how to retrieve the location information lost from the elevator control device 190 by the location recovery system is shown. When the elevator control device 190 loses the current location information of the elevator car 140 or has invalid location information, the elevator control device controls the elevator car 140 to move until moving to the landing having the sensing component 160, and at this time, the sensing component 160 is triggered by the trigger component 150 or senses, and is thus triggered to transmit an electrical signal of a location recovery signal to the calling component 180. In this embodiment, the calling component 180 has a calling button 183 and also has a floor location information module 181. In the calling component 180 arranged for each of the different landings, the floor location information module 181 has different floor location information, i.e., having a different floor address. The calling component 180 also has a floor location information transmission module 182 which can read the floor address from the floor location information module 181 and transmit the floor address to the elevator control device 190 upon receipt of the location recovery signal from the sensing component 160, so that the floor location information that the elevator control device 190 can obtain is the current corresponding floor location of the elevator car 140, the floor location information in the elevator control device 190 is found, and the control of the operation of the elevator system 10 can be continued based on the floor location information.

In the above location recovery process of the elevator system 10, there is no need to enable the elevator car 140 to run to the bottom or top end of the elevator shaft 110 to perform initialization and resetting, and the elevator car 140 runs directly from the current location to the nearest landing 120 having the calling component 180 and the sensing station 160, for the location of the elevator to be recovered. The elevator car 140 travels for a short distance, and the location recovery has been completed even before a passenger feels it, so that the panic of a passenger (the panic due to that the passenger thinks that the elevator is out of control) is greatly reduced during the location recovery process of the elevator system 10, the passenger's experience is improved, and the cost of the additional location recovery system is relatively low.

In particular, when the calling component 180 and the sensing component 160 are provided on each landing 120, the elevator control device 190 can control the elevator car 140 to move from the current location until running to the nearest landing 120 in the location recovery process, the elevator car 140 travels for a shorter distance in the location recovery process, and it is more difficult for a passenger to perceive.

Therefore, it will be appreciated that the cost of the location recovery system and the travel distance of the elevator car 140 in the location recovery process can be evaluated to determine which landings 120 need to be provided with the sensing components 160 or the number of sensing components 160. For example, one sensing component 160 is provided for every other or every three landings 120.

It should be noted that in this embodiment, the elevator system 10 may continue to recognize the floor location and perform control accordingly based on the first location recognition system (not shown) during normal operation after the location recovery.

In yet another embodiment, the trigger component 150, the plurality of sensing components 160, and the plurality of calling components 180 described above may also primarily form a second location recognition system of one embodiment of the present invention that is different from the first location recognition system. The second location recognition system is directly applied to the elevator system 10 in place of the function of the first location recognition system, so that the location is directly recognized based on the second location recognition system during the direct operation of the elevator system 10. The specific working principle of the second location recognition system will be described also in conjunction with FIG. 2.

In FIG. 2, how the current location information of the elevator car 140 is determined by the location recognition system is shown. During the normal operation of the elevator control device 190, since each landing 120 is provided with a calling component 180 and a sensing component 160 coupled to the calling component 180 in this embodiment, every time the elevator car 140 runs to one landing 120, the sensing component 160 is triggered by the trigger component 150 or senses, and is thus triggered to transmit an electrical signal of a location recognition signal to the calling component 180. In this embodiment, the calling component 180 has a calling button 183 and also has a floor location information module 181. In the calling component 180 arranged for each of the different landings, the floor location information module 181 has different floor location information, i.e., having a different floor address. The calling component 180 also has a floor location information transmission module 182 which can read the floor address from the floor location information module 181 and transmit the floor address to the elevator control device 190 upon receipt of the location recognition signal from the sensing component 160, so that the floor location information that the elevator control device 190 can update or obtain is the current corresponding floor location of the elevator car 140, the current floor location information in the elevator control device 190 is confirmed or updated, and the elevator system 10 completes location recognition. During the continuous operation of the elevator system 10, it is possible to continuously recognize the floor location where the elevator car is currently located.

The second location recognition system of the above embodiment utilizes the floor location information of the calling component 180, and can be implemented with only one set of trigger components 150 and sensing components 160, so that the overall cost is low. However, the location recognition accuracy may be relatively insufficient; therefore, the second location recognition system is especially suitable for use in an elevator system of the structure having not more than 9 floors, or even not more than 6 floors, that is, the number n of landings above is less than or equal to 9, or even less than or equal to 6. Of course, it is also particularly suitable for use in low speed elevator systems.

It will be appreciated from the description of the above embodiments that the trigger component 150 and the sensing component 160 in the elevator system 10 may be additionally provided for location recovery (in conjunction with the first location recognition system described above), or provided separately for location recognition in normal operation conditions.

Further referring to FIG. 1, in the elevator system 10 provided with the location recovery system or location recognition system above, if a dummy landing 130 is provided in the elevator shaft 110, in one embodiment and different from the arrangement of the landing 120, the dummy landing 130 is not provided with the sensing component 160, and of course, is also generally not provided with the calling component 180 as shown in FIG. 1. In this way, the trigger component 150 of the elevator car 140 passing through the dummy landing 130 does not act on any sensing component 160, i.e. the elevator system 10 or the elevator control device 190 cannot sense any signal from the sensing component 160 during the location recovery or normal operation, in particular, the elevator control device 190 will not receive any floor location information transmitted from the calling component 180 so that the elevator system 10 or the elevator control device 190 may determine that the location where the elevator car 140 is located is a dummy landing 130, and the elevator control device 190 prohibits opening the car door of the elevator car 140 to prevent a dangerous accident from occurring. Therefore, the elevator system 10 of the embodiment of the present invention can also directly recognize the dummy landing 130, which is extremely advantageous to control the elevator in the event of an emergency event, such as an elevator automatic rescue operation in the event of a power failure.

Figure 3:
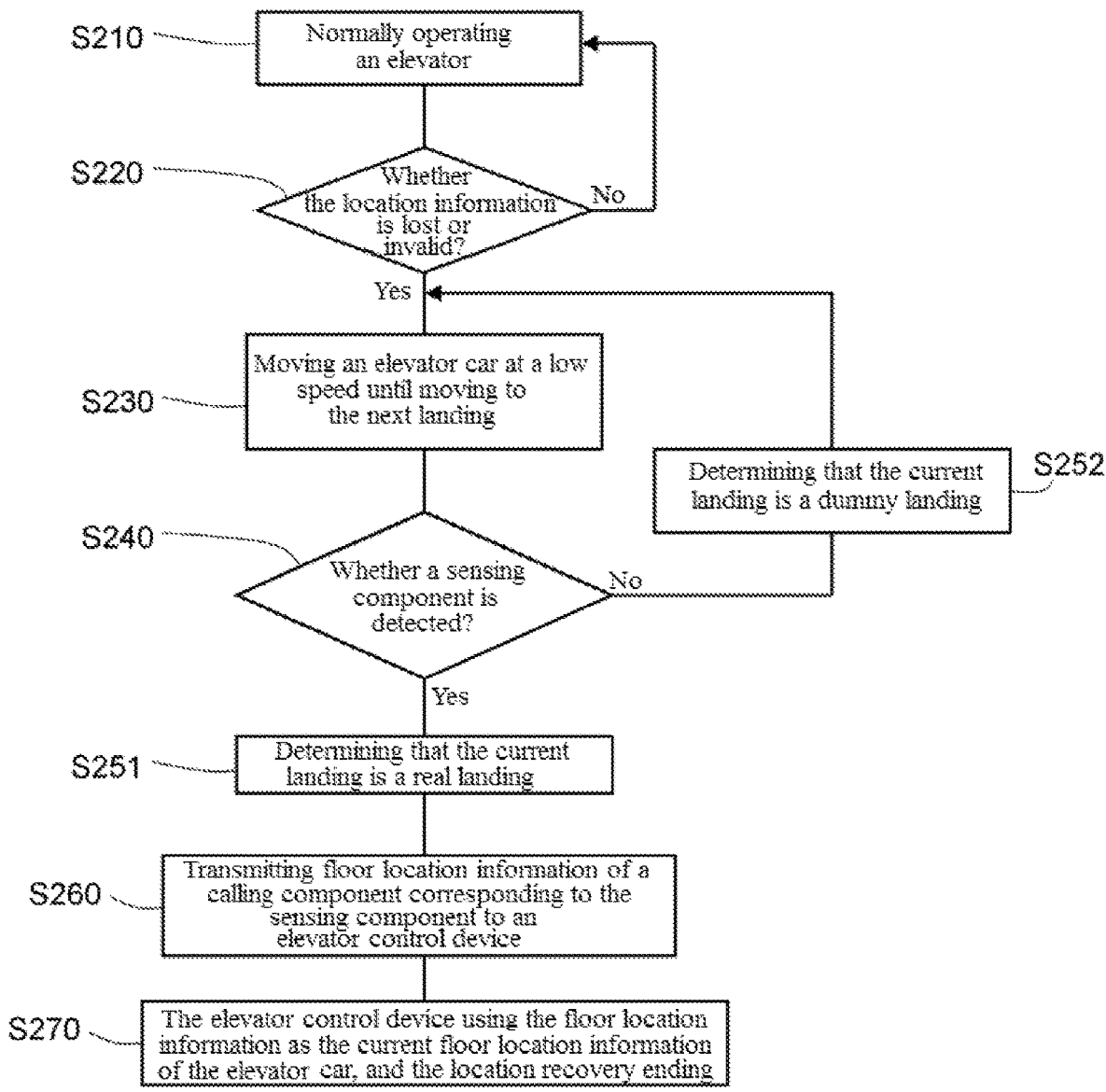
FIG. 3 is a schematic flow diagram of a location recovery method of an elevator system according to one embodiment of the present invention.

FIG. 3 shows a schematic flow diagram of a location recovery method of an elevator system according to one embodiment of the present invention. The processes of the location recovery method of the elevator system 10 are illustrated below in connection with FIGS. 1 to 3, which also includes an example of a dummy landing recognition method.

First, during the normal operation of the elevator system 10, i.e. at step S210, it is continuously judged whether or not the location information of the elevator system 10 is lost or invalid, that is, at step S220, if it is judged as "No", the process returns to step S210, and the normal operation of the elevator system 10 is continued; and if it is judged as "Yes", the process proceeds to step S230, that is, enters the processes of the location recovery method. The above processes may be performed in the elevator control device 190.

Further, at step S230, the elevator control device 190 controls the elevator car 140 to move at a low speed until moving to the next landing, for example, moving upward or downward to the next landing.

Further, at step S240, it is judged whether or not the sensing component is detected. Specifically, if the elevator system 10 or the elevator control device 190 cannot sense any signal from the sensing component 160, it is judged as "No", otherwise it is judged as "Yes".

When it is judged as "Yes", the process proceeds to step S251, where it is determined that the current landing is a real landing (i.e., the landing 120), that is, the non-dummy landing is determined; and if it is judged as "No", the process proceeds to step S252 to determine that the current landing is a dummy landing 130, and the elevator control device 190 prohibits the operation of opening the car door of the elevator car 140 or the like at this time.

Further, at step S260, the floor location information of the calling component 180 corresponding to the sensing component 160 is transmitted to the elevator control device 190.

Further, at step S270, the elevator control device 190 uses the floor location information as the current floor location information of the elevator car 140, and the location recovery ends. Specifically, the calling components 180 for different floors have different data communication addresses. The address information of the calling component 180 for each floor is stored in an internal chip of the elevator control device 190, which can determine the actual floor where the elevator is located by comparing the correspondence relationship of the information stored in the chip on the basis of the transmitted address information, thereby recovering the location. Therefore, the elevator system 10 may continue to operate normally based on the recovered location information.

At this point, the location recovery process of the elevator system 10 is basically completed, and the recognition of the dummy floor is also achieved.

In the location recovery process of the above embodiment, the distance over which the elevator car 140 is controlled to move is relatively short at step S230, and the travel distance of the elevator car 140 during the location recovery is so short that it is difficult for a passenger to perceive, which will not bring panic to the passenger.

Figure 4:
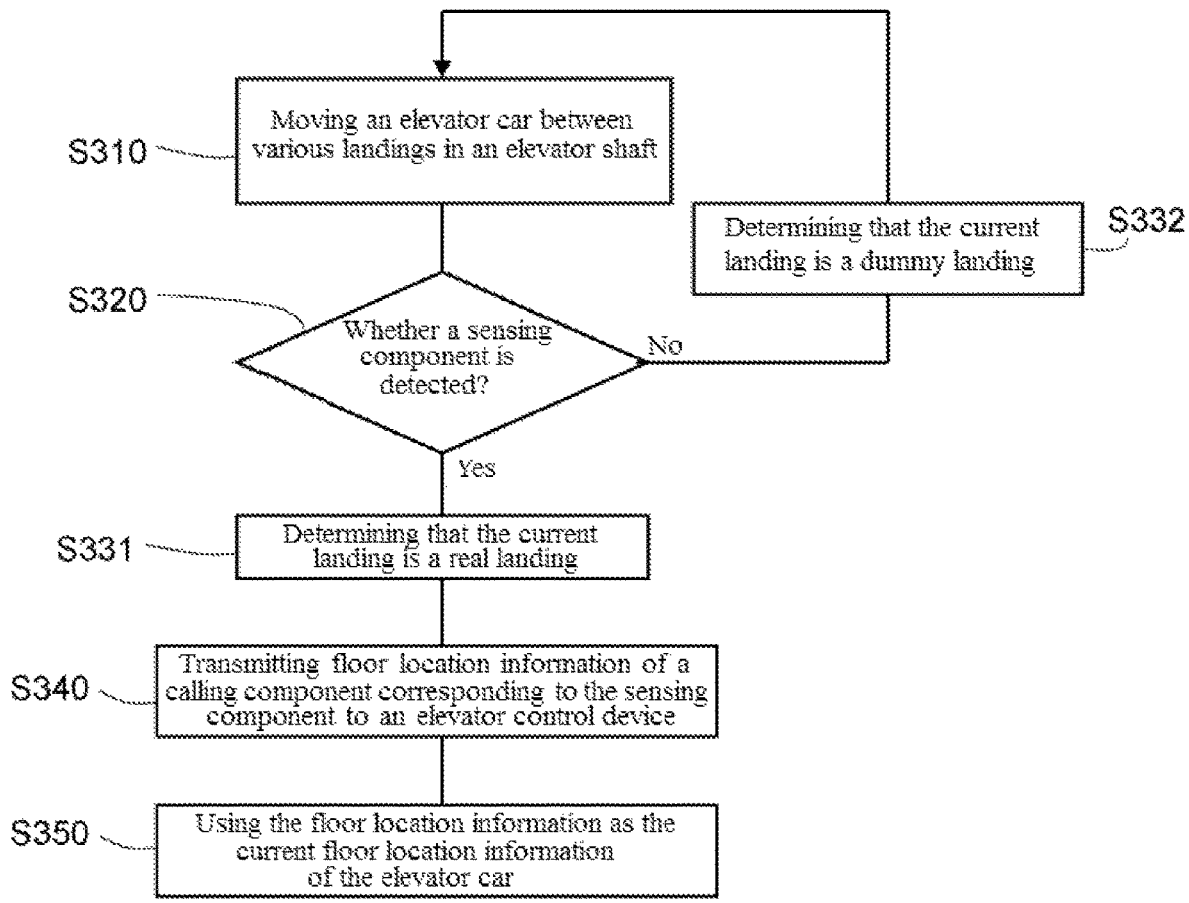
FIG. 4 is a schematic flow diagram of a location recognition method of an elevator system according to one embodiment of the present invention.

FIG. 4 shows a schematic flow diagram of a location recognition method of an elevator system according to one embodiment of the present invention. The processes of the location recognition method of the elevator system 10 are illustrated below in connection with FIGS. 1, 2 and 4, which also includes an example of a dummy landing recognition method.

First, at step S310, during the normal operation, the elevator control device 190 controls the movement, for example upward or downward movement, of the elevator car 140 between various landings (including the landings 120 and the dummy landing 130) in the elevator shaft 110.

Further, at step S320, it is judged whether or not the sensing component is detected. Specifically, if the elevator system 10 or the elevator control device 190 cannot sense any signal from the sensing component 160, it is judged as "No", otherwise it is judged as "Yes".

When it is judged as "Yes", the process proceeds to step S331, where it is determined that the current landing is a real landing (i.e., the landing 120), that is, the non-dummy landing is determined; and if it is judged as "No", the process proceeds to step S332 to determine that the current landing is a dummy landing 130, and the elevator control device 190 prohibits the operation of opening the car door of the elevator car 140 or the like at this time.

Further, at step S340, the floor location information of the calling component 180 corresponding to the sensing component 160 is transmitted to the elevator control device 190.

Further, at step S350, the elevator control device 190 uses the floor location information as the current floor location information of the elevator car 140, and the location recognition ends. The elevator system 10 may continue to control the normal operation of the elevator car 140 based on the floor location information.

At this point, the location recovery process of the elevator system 10 is basically completed, and the recognition of the dummy floor is also achieved.

The location recognition process of the above embodiment is simple and easy to implement, and can recognize the dummy landing, and it is possible to avoid erroneous operation such as opening the car door at the dummy landing.

It will be appreciated that when it is said that a component is "connected" or "coupled" to another component, it may be directly connected or coupled to the other component or there may be an intermediate component.

The above examples mainly describe various elevator systems of the present invention, and a location recovery method, a location recognition method and a dummy landing recognition method therefor. Although only some of the embodiments of the present invention have been described, it should be understood by those of ordinary skill in the art that the present invention may be implemented in many other forms without departing from the spirit and scope thereof. The illustrated examples and embodiments are therefore to be considered illustrative and not restrictive, and the invention may cover various modifications and substitutions without departing from the spirit and scope of the present invention as defined by the appended claims.

What is claimed is:

1. An elevator system comprising:
   an elevator car;
   an elevator shaft comprising a plurality of landings; and
   an elevator control device configured to at least control a movement of the elevator car within the elevator shaft;
   a location recovery system comprising:
   landing floor information components arranged correspondingly on at least two of the plurality of landings and having floor location information of the corresponding landings;
   a sensing component arranged corresponding to each landing floor information component and coupled to the landing floor information component; and
   a trigger component mounted on the elevator car,
   wherein the sensing component is capable of being triggered by the trigger component to transmit a location recovery signal to enable the corresponding coupled landing floor information component to transmit the floor location information of the landing floor information component to the elevator control device;
   wherein the elevator shaft further comprises a dummy landing without the landing floor information component and the sensing component.

2. The elevator system according to claim 1, wherein the elevator control device is configured such that when the elevator control device loses the current location information of the elevator car or has invalid location information, the elevator control device controls the elevator car to move until it moves to a landing having the sensing component.

3. The elevator system according to claim 1, wherein the landing floor information component comprises a calling component.

4. The elevator system according to claim 1, wherein the landing floor information component is arranged correspondingly for each of the landings.

5. The elevator system according to claim 4, wherein the elevator control device is configured such that when the elevator control device loses the current location information of the elevator car or has invalid location information, the elevator control device controls the elevator car to move to the nearest landing.

6. The elevator system according to claim 3, wherein the calling component is coupled to the sensing component via an outgoing communication line of the calling component.

7. The elevator system according to claim 1, wherein the landing floor information component comprises a floor location information transmission module configured to receive the location recovery signal transmitted by the sensing component and to transmit the floor location information of the landing floor information component to the elevator control device.

8. The elevator system according to claim 1, wherein the elevator control device is further configured to determine that a landing where the elevator car is correspondingly located is a dummy landing when the sensing component is not detected.

9. The elevator system according to claim 1, wherein the trigger component comprises a magnetic stripe, and the sensing component comprises a magnetic induction sensor or a reed switch; or the trigger component comprises a light shielding plate, and the sensing component comprises a photoelectric switch.

10. A location recovery method for an elevator system, wherein the elevator system comprises:
an elevator car;
an elevator shaft comprising a plurality of landings; and
an elevator control device configured to at least control a movement of the elevator car within the elevator shaft;
a location recovery system comprising:
landing floor information components arranged correspondingly on at least two of the plurality of landings and having floor location information of the corresponding landings;
a sensing component arranged corresponding to each landing floor information component and coupled to the landing floor information component; and
a trigger component mounted on the elevator car;
wherein the location recovery method comprises:
controlling the elevator car to move until it moves to a landing having the sensing component when the elevator control device loses the current location information of the elevator car or has invalid location information, and triggering the sensing component by the trigger component; and
transmitting the floor location information of the landing floor information component coupled correspondingly to the triggered sensing component as the current location information of the elevator car to the elevator control device.

11. The location recovery method according to claim 10, wherein the elevator system, the landing floor information component is arranged correspondingly for each of the landings;
and in the location recovery method, when the elevator control device loses the current location information of the elevator car or has invalid location information, the elevator control device controls the elevator car to move to the nearest landing.

12. The location recovery method according to claim 10, wherein the elevator shaft further comprises a dummy landing without the landing floor information component and the sensing component;
and in the location recovery method, a landing where the elevator car is correspondingly located is determined to be a dummy landing when the sensing component is not detected.

13. An elevator system comprising:
an elevator car;
an elevator shaft comprising a plurality of landings; and
an elevator control device configured to at least control a movement of the elevator car within the elevator shaft;
a location recognition system comprising:
a calling component arranged correspondingly on each of the landings;
a sensing component arranged corresponding to the calling component of each landing and coupled to the calling component; and
a trigger component mounted on the elevator car,
wherein each of the calling components has floor location information of the corresponding landing, and the sensing component is capable of being triggered by the trigger component to transmit a location recovery signal to enable the corresponding coupled landing floor information component to transmit the floor location information of the calling component to the elevator control device;
wherein the elevator shaft further comprises a dummy landing without the calling component and the sensing component.

14. The elevator system according to claim 13, wherein the calling component is coupled to the sensing component via an outgoing communication line of the calling component.

15. The elevator system according to claim 13, wherein the calling component comprises a floor location information transmission module configured to receive the location recovery signal transmitted by the sensing component and to transmit the floor location information of the calling component to the elevator control device.

16. The elevator system according to claim 13, wherein the elevator control device is further configured to determine that a landing where the elevator car is correspondingly located is a dummy landing when the sensing component is not detected.

17. The elevator system according to claim 13, wherein the trigger component comprises a magnetic stripe, and the sensing component comprises a magnetic induction sensor or a reed switch; or the trigger component comprises a light shielding plate, and the sensing component comprises a photoelectric switch.

18. The elevator system according to claim 13, wherein the number of landings in the elevator system is less than or equal to 6.

19. A location recognition method for an elevator system, wherein the elevator system comprises:
an elevator car;
an elevator shaft comprising a plurality of landings; and
an elevator control device configured to at least control a movement of the elevator car within the elevator shaft;
a location recognition system comprising:
a calling component arranged correspondingly on each of the landings, each of the calling components having floor location information of the corresponding landing;
a sensing component arranged corresponding to the calling component of each landing and coupled to the calling component; and
a trigger component mounted on the elevator car,
wherein the location recognition method comprises:
controlling the elevator car to move until it moves to a landing having the sensing component, and triggering the sensing component by the trigger component; and
transmitting the floor location information of the calling component coupled correspondingly to the triggered sensing component as the current location information of the elevator car to the elevator control device.

20. The location recovery method according to claim 19, wherein the elevator shaft further comprises a dummy landing without the calling component and the sensing component;
and in the location recovery method, a landing where the elevator car is correspondingly located is determined to be a dummy landing when the sensing component is not detected.

21. An elevator system comprising:

an elevator car;

an elevator shaft comprising a dummy landing and a plurality of landings;

an elevator control device configured to at least control a movement of the elevator car within the elevator shaft; and a location recovery/recognition system comprising:

a landing floor information component arranged correspondingly on each of the plurality of landings and having floor location information of the corresponding landing;

a sensing component arranged corresponding to each landing floor information component and coupled to the landing floor information component; and a trigger component mounted on the elevator car, wherein the dummy landing is not provided with the landing floor information component and the sensing component;

wherein the sensing component is capable of being triggered by the trigger component to transmit a location recovery signal to enable the corresponding coupled landing floor information component to transmit the floor location information of the landing floor information component to the elevator control device.

22. The elevator system according to claim 21, wherein the elevator control device is further configured to determine that a landing where the elevator car is correspondingly located is a dummy landing when the sensing component is not detected.

23. The elevator system according to claim 21, wherein the landing floor information component comprises a calling component.

24. The elevator system according to claim 23, wherein the calling component is coupled to the sensing component via an outgoing communication line of the calling component.

25. The elevator system according to claim 21, wherein the landing floor information component comprises a floor location information transmission module configured to receive the location recovery signal transmitted by the sensing component and to transmit the floor location information of the landing floor information component to the elevator control device.

26. The elevator system according to claim 21, wherein the trigger component comprises a magnetic stripe, and the sensing component comprises a magnetic induction sensor or a reed switch; or the trigger component comprises a light shielding plate, and the sensing component comprises a photoelectric switch.

27. A method for recognizing a dummy landing of the elevator system of claim 21, wherein a landing where the elevator car is correspondingly located is determined to be a dummy landing when the sensing component is not detected.

* * * * *